United States Patent [19]

Schneider et al.

[11] 4,207,368

[45] Jun. 10, 1980

[54] DECORATIVE MULTI-LEVEL EMBOSSED SURFACE COVERING

[75] Inventors: Donald E. Schneider, Lititz; George A. Tudor; Gary E. Williams, both of Lancaster, all of Pa.

[73] Assignee: Armstrong Cork Company, Lancaster, Pa.

[21] Appl. No.: 9,289

[22] Filed: Feb. 5, 1979

Related U.S. Application Data

[62] Division of Ser. No. 889,532, Mar. 23, 1978, Pat. No. 4,158,073.

[51] Int. Cl.$^2$ .................... B32B 3/30

[52] U.S. Cl. .................... 428/172; 428/204; 428/207

[58] Field of Search .................... 264/DIG. 66, DIG. 71, 264/112, 119, 123, 126, 131, 132, 78; 427/195, 197, 198, 203, 264, 407 R, 189; 156/277, 242, 246; 428/151, 168, 174, 173, 204, 206, 207

[56] References Cited

U.S. PATENT DOCUMENTS

| | | | |
|---|---|---|---|
| 3,213,787 | 10/1965 | Miller | 96/30 |
| 3,359,352 | 12/1967 | Powell et al. | 264/112 |
| 3,804,657 | 4/1974 | Eyman et al. | 264/126 |
| 3,941,636 | 3/1976 | Drout et al. | 264/112 |
| 3,953,564 | 4/1976 | Weidman | 264/112 |
| 3,956,530 | 5/1976 | McKee, Jr. et al. | 427/195 |

*Primary Examiner*—Stanley S. Silverman

[57] ABSTRACT

The process for making a surface covering having an embossed wear surface, including embossed design portions which differ in elevation and shading, by depositing a liquid resinous base coating onto a backing, depositing a layer of resinous dryblend onto the liquid resinous coating while it is still wet, heating to sinter the dryblend and at least partially set the base coating, producing a design on the sintered layer by applying settable resinous ink to at least a portion thereof in sufficient amounts and viscosity to permit penetration of the ink into the dryblend layer to a depth of about 10 mils (0.254 mm) at the points of application, at least a portion of the design being formed by applying the ink in minute separate but closely spaced deposits, and heating the composite structure for final fusion to form a non-porous sheet wherein the design areas containing the closely spaced ink deposits may differ in shading and elevation in their ink-containing and non-ink-containing portions. These design areas may also differ in shading and elevation from the other ink-containing and non-ink-containing areas of the sheet. The resulting sheet may then be passed around a smooth (or textured) roll with the face of the sheet in contact therewith to provide any smoothing or texturing effect desired. Optionally, an overall resinous top coat may be applied.

16 Claims, 6 Drawing Figures

DECORATIVE MULTI-LEVEL EMBOSSED SURFACE COVERING

This is a division of application Ser. No. 889,532, filed Mar. 23, 1978, now U.S. Pat. No. 4,158,073.

BACKGROUND OF THE INVENTION

1. Field of the Invention

The invention relates generally to a process for producing resinous composition surface coverings and, more particularly, to the process for forming such a product having a multi-level embossed and shaded wear surface. The embossed wear surface on the sheet includes design areas containing minute, closely spaced ink deposits, which areas are, overall, intermediate in elevation between other printed and non-printed areas of the sheet. Additionally, the non-ink-containing portions of the sheet between the minute ink deposits may be at an elevation below that of the ink-containing portions in these areas but above that of other non-ink-containing areas of the sheet. These differences in shading and elevation may be produced from a single printing element.

2. Description of the Prior Art

It is known to produce plastic sheets for floor and wall coverings, and the like, wherein the fused layer contains a thermoplastic synthetic resinous binder, plasticizers and pigments. It is also known to enhance the appearance of such sheets by means of various decorative designs thereon which may extend partially or completely through the sheet. Further enhancement of the appearance of such sheets has been accomplished by achieving a three-dimensional appearance thereon. Prior methods of doing this have included mechanical or chemical embossing techniques, or inclusion with the granules of the sheet-forming composition of an ingredient which can be subsequently removed or altered to produce an embossed effect. It is also known to obtain a textured surface on a resinous surface covering by controlling the fluid viscosity of the printing composition and/or overprinting to increase the amount of ink in selected areas of the sheet. It is further known to print on various substrates by applying the printing composition in minute separate but closely spaced deposits which, when viewed from the intended distance for vision, presents the appearance of a continuous coating. It is also known to provide a background color for the wear layer of a resinous sheet which partially penetrates the back of the layer and provides a decorative contrast and depth effect when viewed in combination with the top surface design elements which extend from the face of the sheet down into the wear layer.

U.S. Pat. No. 3,359,352-Powell el al relates to a method for forming a resinous composition surface covering having a geometric decoration. This is accomplished by depositing a layer of fine granules of resinous composition on the surface of a base which may have been previously coated with a pigmented resinous composition to hide the color of the backing and to form a good background for the printed design in the event the backing would be visible. The granular layer is then heated to sinter the granules to form a porous layer, a design is formed on the sintered layer with a printing composition which will penetrate into the porous composition. Then, by heat, with or without pressure, the printed porous layer is formed into a non-porous layer containing an inlaid design. It is further disclosed by this patent that a textured or embossed product can be obtained by controlling the fluid viscosity of the printing composition, and/or overprinting to increase the amount of ink in selected areas of the sheet, or by including with the granules a substance which, on further treatment, will create voids in the granular layer. Controlling the amount of printing composition to fill such voids controls the location and elevation of embossing.

U.S. Pat. No. 3,213,787-Miller relates to simultaneous multi-colored printing wherein there is provided on a gravure cylinder a plurality of types of image printing cavities, each type being selective of a particularly colored printing composition, the several types of image printing cavities being located on the surface in accordance with the arrangement of color ("hue") in the graphic subject matter or other colored original of which a duplicate is desired. The depth of each cavity is determined by the intensity required for that particular color at the particular point. The inks are transferred from the treated surfaces of the cylinder to the surface of the paper in a pattern established by the arrangement of the treated cavities in the cylinder surface. It is stated that it is believed that shading is achieved by the lateral flow of ink along individual fibers or between adjacent fibers of the paper which results in overlapping colored areas and makes possible the subtractive transmission of light. Surfaces which prevent the lateral flow of ink, including various films and foils may also be printed in multi-color in a single operation. In such cases, the separate small areas of ink may remain as separate dots of color, to give an impression of uniform coloring when seen from a sufficient distance. In an alternative multi-color printing process, the principles of this invention are combined with procedures and principles of Intaglio half-tone printing, in which the ink-accepting cavities are all of substantially equal depth but vary in area inversely with the intensity of the light image.

U.S. Pat. No. 2,649,386-Snowman, Jr. relates to the coating of paper wherein the coatings which are discontinuous give the appearance of being uniform. This is accomplished by applying the coating in accordance with a uniform minute pattern formed upon an applicator or coating roll. Such a pattern, for example, can comprise a minute grid design or a plurality of minute, uniformly spaced, separate depressions formed in the applicator roll surface. The resulting fine coated and uncoated areas of the paper are of such small dimensions that they are not independently readily noticeable as viewed with the naked eye at the intended distance for vision, and consequently, the paper presents the appearance of being entirely uniform with the minute dots of coating composition being substantially embedded in the paper whereby a surface will be produced having greatly enhanced printing qualities in appearance.

U.S. Pat. No. 3,259,515-Pecker relates to a method for reducing the gloss of printed surface coverings wherein the fused wear layer of the surface covering is printed with small transparent deposits of resinous printing ink spaced apart over the entire surface of the product and the ink is then dried. The area of the ink deposits determines the gloss of the product. The smaller the deposits, the higher the gloss of the product and the wider the deposits, the less gloss. The gloss, therefore, is controlled by limiting the area of original surface exposed.

In contrast to the prior processes, the present process, using conventional equipment, obtains unexpected and improved results by providing a way to achieve in-register shading and multi-level embossing on a plastic surface covering from a single printing element. The design areas printed with the minute separate, closely spaced ink deposits are, as a whole, retained, after fusion, at an elevation higher than the completely uninked areas and lower than other ink-containing areas printed in the normal manner. The surface of the dot printed areas may be rendered substantially smooth or embossed as desired by merely controlling the spacing of the minute ink deposits and their penetration into the sheet. The coaction of the color of the closely spaced ink deposits which penetrate into and are visible below the surface of the sheet, together with the increased thickness of the unprinted areas between the dots, and the background color which is visible in the completely uninked areas and between the minute spaced ink deposits further contribute to the improved aesthetic properties of the design. Thus, the process of this invention provides a relatively simple and inexpensive procedure for producing a highly decorative multi-level embossed wear surface, not obtainable using prior methods, on a resinous surface covering without the need for prior mechanical or chemical embossing techniques.

SUMMARY OF THE INVENTION

This invention relates to a process for producing a surface covering having a decorative multi-level wear surface including embossed portions which differ in elevation and shading, the shading and embossing being in register with each other. In this process, a plastisol or other liquid resinous coating is formed on the upper surface of a backing. A resinous dryblend layer is then deposited onto the resinous coating while it is still wet. This is followed by a heating step to cause partial melting of surface portions of the granules at their points of contact and partially set the base coating. After cooling, bonds are formed between adjacent granules of the dryblend layer, and a cohesive, porous layer results. A design is formed on the sintered dryblend layer by applying settable resinous ink to at least a portion of the upper surface. The ink is applied in sufficient amounts and viscosities to permit penetration to at least a depth of about 10 mils (0.254 mm) at the points of application. At least a portion of the design on the sintered dryblend layer is formed of minute, closely spaced ink deposits which are separated from each other by non-ink-containing portions of the dryblend layer. The composite sheet so formed is then heated to finally fuse all resinous material to form a non-porous sheet having embossed portions which differ in elevation and shading. Optionally, an overall resinous final top coat may be applied.

By applying the settable resinous ink to portions of the design in minute, closely spaced deposits, not only can a variation in shading on a resinous composition surface be achieved, but variations in the level of embossing between the fully printed areas, the dot-printed areas, and the areas devoid of printing are achieved. The term "dots" as used herein is intended to mean very small deposits of resinous ink which may be any of a number of different shapes, such as round, triangular, hexagonal, etc. For the purposes of this invention, the dots, or very small deposits of ink, may be applied in a concentration in the range of from about 25 per square inch (6.45 sq. cm.) to 8,100 per square inch (6.45 sq. cm.). The term "small deposits" means that the maximum transverse measurement would be about 3/16 of an inch or 4.76 mm.

As spelled out herein, there is less overall reduction in the thickness of the dot-printed areas of the fused dryblend layer than can logically be expected or accounted for by the amounts of resin present in these areas. The overall elevation of the dot-printed areas, after fusion of the resinous sheet, is at an elevation intermediate between that of fully or solid-print areas of the sheet and completely non-printed areas. It has further been found, in contrast to prior art teachings, that by printing in minute, closely spaced dots, the elevation of the non-printed portions of the dryblend sheet between the dots may be, after fusion of the sheet, retained at the same level as that of the dots themselves, or, may be reduced below the elevation of the dots (but still higher than other completely non-printed areas) by regulation of the spacing between the printed dots. Further variations in shading can be achieved and accentuated, if desired, by printing some of the dots in a partially overlapping or out-of-register manner.

When a dryblend composition is used which is clear after fusion and a colored plastisol base coating is used, the base coating penetrates the dryblend layer to a certain extent, causing it to take on, to some extent, the color of the base layer. This, in combination with the minute, closely spaced dots which may be of a color different from that of the base layer, together with the fact that in the spaces between the dots, the color of the base layer can be seen, and the fact that some of the dots may be printed in a partially overlapping manner with a still different color or colors, extensive variation in shading and elevations of embossing may be obtained. This has not been possible through the use of prior processes even where there was included in the dryblend composition a substance or substances which subsequently could be and would have to be altered or removed to achieve embossing.

Through the use of this process it has been found that by using conventional equipment a resinous surface covering may be provided with a multi-level embossed wear surface having design portions which not only may differ in elevation in the fully printed and non-printed areas but also includes dot-printed design areas which are, overall, intermediate in elevation. These dot-printed areas further include non-ink-containing areas between the dots which may be retained, after fusion, at an elevation substantially even with that of the dots, or may be at a lower elevation as desired, but are still elevated above the completely non-ink-containing areas of the sheet.

the height of the unprinted portions between the dots; and, the effects on these portions caused by varying the spacing between the dots. Also indicated is the height range of fully printed areas and the melted-down height of completely uninked areas.

DESCRIPTION OF THE PREFERRED EMBODIMENT

This invention is applicable to all thermoplastic resinous materials such as poly(vinyl chlorides) and vinyl chloride-vinyl acetate polymers, which in granular form may be formed into a cohesive porous layer on a substrate.

Figure 1:
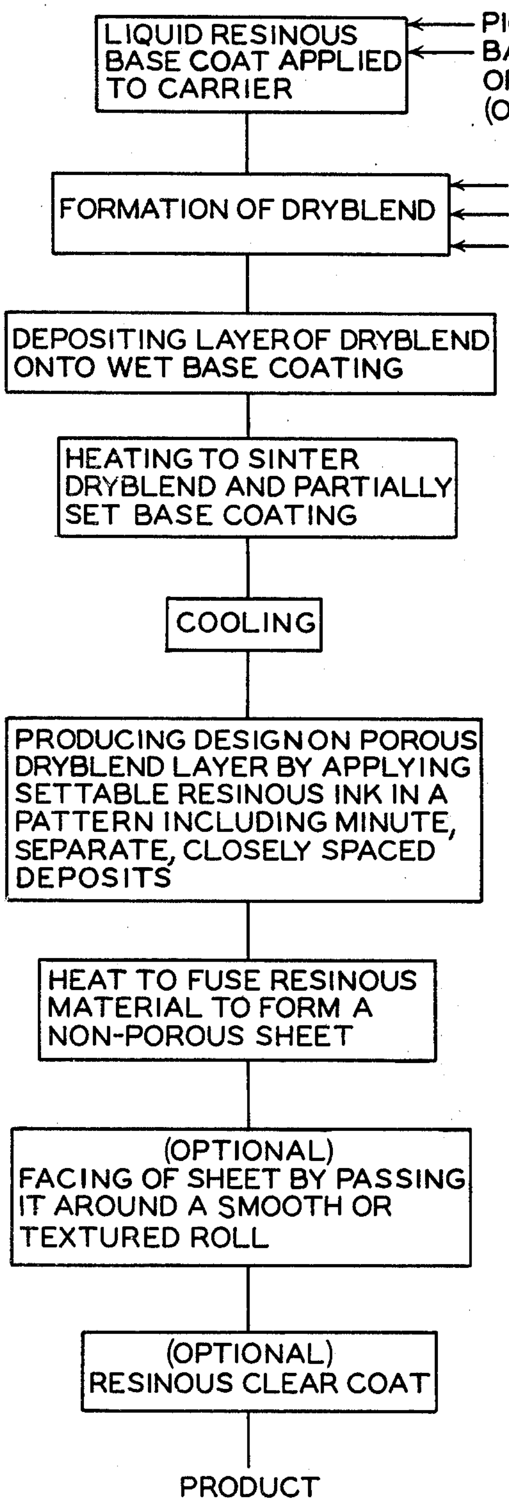
FIG. 1 is a flow diagram depicting the steps followed in carrying out the process of this invention.

As indicated by the flow diagram of FIG. 1 of the drawings, the manufacturing process begins with the application of a resinous base coat, which may be pigmented, to a carrier, which may be a release-coated temporary backing such as cellulosic paper or a release-coated belt. A permanent backing may be used. An unpigmented base coat which is transparent after fusion may be used on a colored backing. If a permanent backing is used, it may comprise any of the backings normally used as a floor covering backing, such as a beater saturated rubber-asbestos sheet, resin-bonded glass webs, bonded synthetic webs, and asphalt-saturated felts. These carriers may be the only final backing or they may be supplemented with other cushioning materials, such as foams and non-woven material.

The preferred coating is a pigmented plastisol which may be applied in a thickness of about 2 to 10 mils (0.051 mm to 0.254 mm) in a known manner to the upper surface of the permanent carrier.

A plastisol can be defined as a thermoplastic resin in the form of fine particles thoroughly and uniformly dispersed in plasticizer in the presence of small amounts of pigments, fillers, and stabilizers. A plastisol has appreciable fluidity at normal room temperatures but is converted by heat into a flexible, tough, thermoplastic mass. This ultimate result is brought about by the process of fusion wherein the resin becomes plasticized and solvated by the plasticizer. Other pigmented base coatings such as paints, lacquers, or organosols, for example, may be used instead of the plastisol coating if desired.

The preferred plastisol coating composition used in the present invention may be prepared using the following ingredients in the indicated ranges:

| Ingredients | Parts by Weight |
|---|---|
| Poly(vinyl chloride) Dispersion Grade Resin (Mw = 105,000) | 60.0-100.0 |
| Poly(vinyl chloride) Blending Grade Resin (Mw = 80,000) | 0.0-40.0 |
| Di-2-ethylhexyl phthalate plasticizer | 20.0-40.0 |
| 2,2,4-trimethyl-1,3 pentanediol diisobutyrate | 15.0-30.0 |
| Tin Maleate - Stabilizer | 1.5-5.0 |
| Limestone - Filler | 0.0-50.0 |
| Pigment | 1.0-10.0 |

The next step in the process is the formation of the resinous dryblend. The dryblend is in the form of a free-flowing, homogeneous, powdery mixture of unfused thermoplastic resin particles, liquid vinyl plasticizers, filler, pigment, and vinyl stabilizer.

Poly(vinyl chloride) is the preferred resin for use in forming the surface covering of the present invention, although copolymers of vinyl chloride with minor portions of other materials such as vinyl acetate, vinylidene chloride, other vinyl esters such as vinyl proprionate, vinyl butyrate, as well as alkyl substituted vinyl esters may be used. A typical poly(vinyl chloride) resin for dryblending would have a particle size ranging from 50-350 microns (0.05-0.35 mm).

The free-flowing mix of resin, plasticizer, and stabilizer, may be readily formed by adding the resin, for example, a homopolymer of vinyl chloride, in the form of discrete particles, along with the vinyl resin plasticizer such as di-2-ethylhexyl phthalate, butylbenzyl phthalate, epoxidized soybean oil or tricresyl phosphate, filler, pigment, and suitable vinyl resin stabilizers to a mixer or blender such as a Henschel blender where they are mixed under moderate heat, for instance, at a temperature of about 200° F. (93° C.), for a period of time to ensure that the liquid plasticizer and stabilizer become absorbed and thus diffused throughout the resin particles and the remaining ingredients adsorbed thereon. Care is taken so that no fusion of the resin particles occurs during the mixing, and the temperature must be kept below that at which such would occur.

Generally speaking, the addition of fillers and pigments to the mix may be made either initially, at the end of the mixing cycle when the resin particles remain relatively warm, or after the dryblended resin particles have been mixed and cooled. The color of the layers may be controlled over a wide range and substantially transparent or translucent layers may be achieved by omitting the filler and most or all of the pigment from the vinyl dryblend forming the layer. Based on 100 parts by weight of resin, 25-50 parts by weight plasticizer, 1.5-5.0 parts by weight stabilizer, 0-5 parts by weight pigment, and 0-30 parts by weight filler may be used in forming the free-flowing mixture.

The next step in the process comprises the formation of a layer of the dryblend granules having a thickness in the range of about 20-60 mils (0.51 to 1.52 mm) on the wet plastisol coating on the carrier. The plastisol coating penetrates up into the dryblend layer a distance of from 2-10 mils (0.051 to 0.254 mm). Average penetration is about 4 mils (0.10 mm). Methods of lay-up of such a dryblend layer, such as doctoring, are well known in the art.

The next step in the process involves heating the dryblend in the range of from about 260° F. to 330° F. (127° C. to 166° C.) to cause partial melting of the resin granules at their points of contact, whereby upon subsequent cooling, bonds will be formed which result in formation of a porous cohesive layer having a significant number of voids (in the range of 30% -60% of the volume) distributed throughout its thickness. The porous dryblend layer, having a thickness in the range of from about 20 to 60 mils (0.51 to 1.52 mm), is also bonded to the carrier. Bonding of the resinous granules at their points of contact may be effected either by sintering or through activation of an external adhesive coating which may be applied in the final steps of granulation. Adhesives which may be applicable for bonding include hot melt adhesives and soluble (water, alcohols, ketones) resins.

The next step of the invention involves the production of a design on the porous layer by the application of settable resinous inks. The term "settable" as used herein with reference to the ink is meant to include thermoplastic and thermosetting inks which may be set or gelled by heat or chemical means. The ink composition would normally include a thermoplastic resin binder along with suitable pigments, plasticizers, dyes, and stabilizers. The preferred ink for use in the present invention includes the following ingredients usable in the following ranges:

| Ingredients | Parts by Weight | Preferred |
|---|---|---|
| Poly(vinyl chloride) Dispersion Grade Resin (Mw = 105,000) | 60.0–100.0 | 100.0 |
| Poly(vinyl chloride) Blending Grade Resin (Mw = 80,000) | 0.0–40.0 | 0.0 |
| Di-2-ethylhexyl phthalate plasticizer | 20.0–40.0 | 25.0 |
| 2,2,4-trimethyl-1,3 pentanediol diisobutyrate | 15.0–30.0 | 15.0 |
| Tin Maleate - Stabilizer | 1.5–5.0 | 1.5 |
| Limestone - Filler | 0.0–50.0 | |
| Pigment (Carbon Black) | 1.0–10.0 | 5.0 |

After cooling, the porous layer may be printed with the ink in sufficient amounts to cause penetration thereof through at least about 10 mils (0.254 mm) of the thickness of the layer in the dot-printed areas and preferably through the entire thickness thereof to the backing in the fully or solid printed areas. Printing may be done, for example, by a flat or rotary screen printer or by an engraved or etched roll, or by any other method which is adapted to supply the ink in the manner and quantities necessary to produce the desired results. The ink may be colored as desired by means of dyes or pigments, or the inks may be colorless.

The designs to be used in applying the ink to the sintered dryblend are limited only by the imagination of the designer. Varieties of colors, shapes, and representations may be used. Depending on the needs of the designer, the concentration of the dots, size of the dots, spacing of the dots, and overlapping or out-of-register printing of dots may be preselected and arranged to achieve the desired results.

In the present invention, the inks are preferably applied by one or more rotary screen printers. The mesh size of the screen (or screens) may be in the range of about 5 to 90 holes per lineal inch (2 to 35 holes per lineal cm.). The holes may be any of a variety of shapes such as circular, hexagonal, diamond, etc. Cylindrical screens, such as, for example, those produced by the process of U.S. Pat. No. 3,763,030-Zimmer, are usable in the process of the present invention. Conventional rotary screen printers may be used and the combinations of the parts of these printers may be varied to achieve varying degrees of penetration of the ink into a porous surface.

The next step in the manufacture of the surface covering of this invention is fusion of all of the resinous material. The sheet so formed may then be faced by feeding it around a textured roll or around a smooth roll, with the printed face of the sheet in contact therewith using only web tension, or additional pressure as may be provided by a suitable back-up roll, serving to impart surface gloss or surface configuration of the roll to the unembossed areas of the sheet. Optionally, a final overall clear resinous top coat may be applied.

Figure 2:
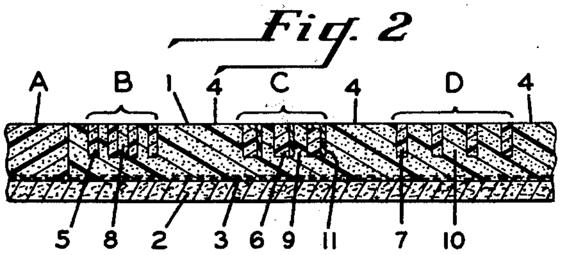
FIG. 2 is a simplified and enlarged diagrammatic view of a cross section of a portion of the printed dryblend product of this invention before fusion.

FIG. 2 of the drawings illustrates a simplified, enlarged diagrammatic cross section of a printed dryblend product before fusion, wherein a sintered layer of dryblend 1 is laid up on a backing 2 which has previously had applied thereto a pigmented plastisol layer 3, which has penetrated into the dryblend layer 1. The sintered dryblend layer was then printed with a plurality of resinous inks to create design areas A, B, C, and D interspersed with completely non-printed areas 4. The number and types of inks used here will be understood as being by way of example and not limiting. Inked areas B, C, and D are shown as extending only partially through the thickness of the sintered dryblend layer, while printed areas such as indicated at A extend completely through the thickness of the layer. This is to demonstrate that the penetration of the inks may be regulated as desired. Formulations of the ink compositions may also be varied to achieve the elevation and surface textures desired on the embossed surface of the sheet. As previously stated, however, critical to the improvement of this invention is the printing of at least a portion of the design in the form of small, separate, but closely spaced ink deposits such as indicated at 5, 6, and 7 separated by non-ink-containing portions 8, 9, and 10 of the dryblend layer 1. Numeral 11 indicates a small ink deposit printed out of register to partially overlap ink deposits 6 of inked area C.

Figure 3:
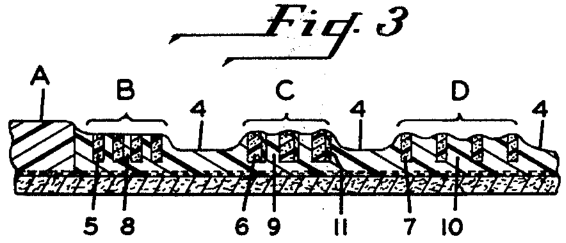
FIG. 3 is an enlarged diagrammatic cross-sectional view of a portion of the product of this invention after fusion of the resinous material of the sheet.

FIG. 3 illustrates an enlarged cross section of the product formed after fusion of the resinous material of the sheet. As shown in FIG. 3, the fully printed design area A retains approximately its original height. The design areas B, C, and D of the sheet which were printed with the small, separate, closely spaced ink deposits 5, 6, 7, and 11 are lower in overall maximum elevation than fully printed area A; the non-ink-containing areas 9 and 10 between the small ink deposits 6 and 7 are reduced in elevation or thickness below that of the portions of the sheet at the location of the small ink deposits 6 and 7 but are retained at a higher elevation than that of the completely uninked areas 4 of the sheet. Non-ink-containing areas 8 are retained at substantially the same elevation as ink deposits 5 due to the closeness of their spacing.

Figure 4:
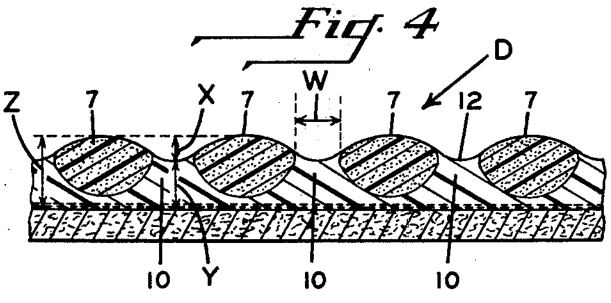
FIG. 4 is an enlarged and more realistic cross-sectional view of the dot-printed area D of the fused product shown in FIG. 3.

FIG. 4 illustrates a greatly enlarged and more realistic cross section of the design area D of the dryblend layer 1 printed with the small ink deposits 7 which are separated by the non-ink-containing areas 10 therebetween. In this view, the distance between adjacent edges of the small ink deposits after penetration and spreading, or the inner ink distance, is indicated by the letter W. The depth of the debossed area between the small ink deposits 7 is indicated by the letter X and is measured as the distance between a line run tangent to the highest elevation point of the ink deposits 7 and a line tangent to the lowest point of the depressed portion 12. The thickness of the non-ink-containing portion of the dryblend layer 1 occurring between the small ink deposits 7 is indicated by the letter Y and is the distance from the lowest point of the depressed portion 12 between the ink deposits 7 to the upper surface of the backing 2.

Figure 5:
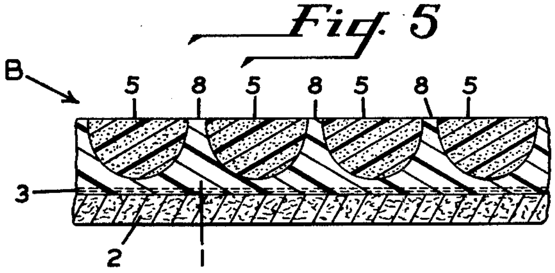
FIG. 5 is an enlarged and more realistic cross-sectional view of the dot-printed area B of FIG. 3, wherein the dots are closely spaced and the wear surface is substantially flat or unembossed.

FIG. 5 is a greatly enlarged and more realistic cross section of the design area B wherein the small ink deposits 5 were placed closer together than the ink deposits 7 shown in FIG. 4. Due to the closer spacing and other variables as explained later herein, the elevation of the ink deposits 5 and the non-ink-containing portions 8 therebetween were substantially similar in elevation after fusion of the sheet resulting in a substantially flat surface of the design area B.

Products which can be manufactured within the scope of this invention may include, but are not limited to, floor coverings, wall coverings, drapery and upholstery materials, and furniture components. Multi-level sheet products may be manufactured by the method of this invention without the use of chemical or mechanical embossing equipment and techniques, and the embossed areas thereon are in perfect registration with the printed pattern.

The following examples illustrate several embodiments of the invention. All parts are by weight unless otherwise stated.

EXAMPLE 1

A plastisol back coating having the following composition was prepared:

| | Parts by Weight |
|---|---|
| Poly(vinyl chloride) Dispersion Grade Resin | 100.0 |
| Di-2-ethylhexyl phthalate plasticizer | 25.0 |
| 2-2,4-trimethyl-1,3-pentanediol diisobutyrate | 15.0 |
| Modified tin maleate (stabilizer) | 1.5 |
| Pigment | 5.0 |

A beater-saturated sheet of rubber and asbestos of approximately 0.037" (0.94 mm) thickness was coated on one surface with 2-5 mil (0.051-0.127 mm) thickness of the above composition.

Dryblend granules were prepared by mixing the following components together in a conventional Henschel dryblending apparatus through a heat history from ambient conditions to approximately 230° F. (110° C.) to ambient conditions.

| | Parts by Weight |
|---|---|
| Poly(vinyl chloride) homopolymer dryblend resin Molecular weight 83,900 - average particle size 225 microns | 100.0 |
| Di-2-ethylhexyl phthalate plasticizer | 40.0 |
| Tin Maleate - Stabilizer | 1.5 |

The granules were deposited on the wet coating on the base sheet to form a uniform layer of about 30 mils (0.762 mm) thickness. The sheet was then heated in an air impingement oven for approximately 1.5 minutes at 400° F. (204° C.) to gel the plastisol back coat and sinter the dryblend. This results in two layers on the base sheet consisting of a 25 mil (0.635 mm) sintered top portion and a 5 mil (0.127 mm) portion consisting of the gelled plastisol with the sintered dryblend embedded therein.

The sintered mass is then cooled and a design is printed on its surface. The following printing composition was used:

| | Parts by Weight |
|---|---|
| Poly(vinyl chloride) Dispersion Grade Resin (Mw = 105,000) | 100.0 |
| Di-2-ethylhexyl phthalate (Plasticizer) | 25.0 |
| 2,2,4-trimethyl-1,3 pentanediol diisobutyrate | 15.0 |
| Tin Maleate (Stabilizer) | 1.5 |
| Pigment (Carbon black) | 5.0 |

The printing was done using a rotary screen having a mesh size of 4 holes/cm., with distances between openings varying from about 15 mils (0.38 mm) to 75 mils (1.9 mm), at a line speed of 20 fpm (6.1 meters/min.). Some portions of the design were printed with separate but closely spaced ink deposits. In other portions of the design, the ink was applied to cover larger areas and in amounts sufficient to cause penetration through the dryblend layer to the coated surface of the backing (fully printed). The fully printed areas are areas in which dots are not individually discernable. In some cases, the fully printed areas were continuous and in others discontinuous.

The coated sheet carrying the printed sintered composition is then heated in a hot air oven for a period of 1.5 minutes to a temperature of 350°-400° F. (152°-204° C.) to fuse all of the resinous material.

The final product is an embossed floor covering having a decorative embossed and shaded surface having design areas at different elevations and wherein at least some of the printed design areas include non-ink-containing portions which are at a different level than the fully printed and completely non-printed design areas.

The following table of four examples, 2 through 5, compares the thickness, or elevation, of the fused sheet at its fully printed, dot-printed, and non-printed areas. The table also shows the average embossing depths in the fused sheet of the non-ink-containing portions located between the closely spaced ink deposits in the dot-printed areas and the variance ofthe embossing depths as the spacing between the dots are varied. The table further shows the embossing depths obtained in these areas when two different inks, each having two different viscosities, are used on substrates of different thicknesses. The nominal thickness of the sheet in the dot-printed areas was measured from the top of the dots in the printed portions and from the lowest part of the non-printed debossed or melted-down portion between the dots to the back of the sheet. The embossing depth in the dot-printed areas, of course, is equal to the difference in thickness between the printed and non-printed measurements as indicated in the table.

In Examples 2 through 5, the same backing, the same plastisol coating, and the same dryblend prepared in the same way as set forth in Example 1 were used.

As in Example 1, the printing was done using a single rotary screen. The mesh and sizes of the openings in the screen were as indicated in the tables. The coated sheets carrying the printed, sintered composition was finally fused as in Example 1.

EXAMPLES 2 THROUGH 5

Mesh Size 10 (Openings Per Lineal Inch)

Opening Size Decreases as the Number Designating the Screen Opening Size Increases

| Example No. | Screen Opening Size | Ink Formula and Viscosity | Nominal Substrate Thickness in Mils: Printed | Nominal Substrate Thickness in Mils: Nonprinted | Distance Between Adjacent Edges of Ink Deposits (Mils) | Embossing Depth (Mils) | Ink penetration |
|---|---|---|---|---|---|---|---|
| 2 | 1 | *Formula 1 6,000 cps | 30.1 (.76 mm) | | 0 | 0.4 (0.01 mm) | |
| 2 | 4 | Formula 1 | 28,8 (.73 mm) | | 0 | 0.2 (0.005 mm) | 100% |

-continued

EXAMPLES 2 THROUGH 5

Mesh Size 10 (Openings Per Lineal Inch)

Opening Size Decreases as the Number Designating the Screen Opening Size Increases

| Example No. | Screen Opening Size | Ink Formula and Viscosity | Nominal Substrate Thickness in Mils: Printed | Nominal Substrate Thickness in Mils: Nonprinted | Distance Between Adjacent Edges of Ink Deposits (Mils) | Embossing Depth (Mils) | Ink penetration |
|---|---|---|---|---|---|---|---|
| | | 6,000 cps | | | | | |
| 2 | 10 | Formula 1 6,000 cps | 26.0 (.66 mm) | 24.4 (.62 mm) | 11.4 (.29 mm) | 1.6 (0.04 mm) | |
| 2 | 12 | Formula 1 6,000 cps | 24.6 (.62 mm) | 22.2 (.56 mm) | 26.5 (.67 mm) | 2.4 (0.06 mm) | |
| 2 | 14 | Formula 1 6,000 cps | 22.9 (.58 mm) | 19.7 (.50 mm) | 43.7 (1.1 mm) | 3.2 (0.08 mm) | |
| 2 | 16 | Formula 1 6,000 cps | 22.3 (.57 mm) | 19.8 (.50 mm) | 53.5 (1.36 mm) | 2.5 (0.06 mm) | |
| 2 | N/A | Formula 1 6,000 cps | | 18.4 (.47 mm) | ∞ | 0.7 (0.02 mm) | |
| 3 | 1 | Formula 1 3,000 cps | 31.2 (.79 mm) | | 0 | 0.3 (0.008 mm) | 91% |
| 3 | 6 | Formula 1 3,000 cps | 28.7 (.73 mm) | | 0 | 0.4 (0.01 mm) | 100% |
| 3 | 12 | Formula 1 3,000 cps | 25.6 (.65 mm) | 22.1 (.56 mm) | 21.9 (.56 mm) | 3.5 (0.09 mm) | 95% |
| 3 | 14 | Formula 1 3,000 cps | 23.9 (.61 mm) | 19.4 (.49 mm) | 33.7 (.86 mm) | 4.8 (0.12 mm) | 97% |
| 3 | 16 | Formula 1 3,000 cps | 23.0 (.58 mm) | 19.0 (.48 mm) | 42.3 (1.07 mm) | 3.8 (0.10 mm) | 100% |
| 3 | N/A | Formula 1 3,000 cps | | 19.3 (.49 mm) | ∞ | 0.7 (0.02 mm) | |
| 4 | 1 | **Formula 2 14,000 cps | 29.5 (.75 mm) | | 0 | 0.2 (0.005 mm) | |
| 4 | 4 | Formula 2 14,000 cps | 27.7 (.70 mm) | | 00 | 0.5 (0.01 mm) | 97% |
| 4 | 8 | Formula 2 14,000 cps | 25.2 (.64 mm) | 24.6 (.62 mm) | 3.7 (0.09 mm) | 0.6 (0.015 mm) | |
| 4 | 10 | Formula 2 14,000 cps | 24.0 (.61 mm) | 22.5 (.57 mm) | 15.6 (0.40 mm) | 1.5 (0.038 mm) | |
| 4 | 12 | Formula 2 14,000 cps | 22.6 (.57 mm) | 20.0 (.51 mm) | 32.5 (0.83 mm) | 2.6 (0.07 mm) | |
| 4 | 14 | Formula 2 14,000 cps | 23.0 (.58 mm) | 20.5 (.52 mm) | 40.9 (1.04 mm) | 2.6 (0.07 mm) | |
| 4 | 16 | Formula 2 14,000 cps | 21.5 (.55 mm) | 18.3 (.46 mm) | 58.3 (1.48 mm) | 3.2 (0.08 mm) | 96% |
| 4 | N/A | Formula 2 14,000 cps | | 18.0 (.46 mm) | ∞ | 0.4 (0.01 mm) | |
| 5 | 1 | Formula 2 11,000 cps | 53.4 (1.36 mm) | | 0 | 0.6 (0.015 mm) | 49% |
| 5 | 6 | Formula 2 11,000 cps | 51.2 (1.3 mm) | | 0 | 0.4 (0.01 mm) | 51% |
| 5 | 12 | Formula 2 11,000 cps | 45.0 (1.14 mm) | 44.3 (1.13 mm) | 27.0 (0.69 mm) | 0.7 (0.015 mm) | 50% |
| 5 | 14 | Formula 2 11,000 cps | 41.7 (1.06 mm) | 40.8 (1.04 mm) | 31.5 (0.8 mm) | 0.8 (0.02 mm) | 47% |
| 5 | 16 | Formula 2 11,000 cps | 40.5 (1.03 mm) | 39.3 (1.00 mm) | 46.4 (1.18 mm) | 1.1 (0.03 mm) | 52% |
| 5 | N/A | Formula 2 11,000 cps | | 36.2 (.92 mm) | ∞ | 0.5 (0.013 mm) | |

*Formula 1 is a plastisol having the same formula as that shown for the printing composition in Example 1. The poly(vinyl chloride) dispersion grade resin used is a type that exhibits shear thickening rheological behavior.

**Formula 2 is a plastisol having the same formula as that shown for the printing composition in Example 1. The poly(vinyl chloride) dispersion grade resin used is a type that exhibits shear thinning rheological behavior.

Because of the complex flow behavior, these formulas are characterized by 20 RPM, #6 Spindle viscosity measurements using a Brookfield Viscosimeter.

As indicated by the above table, the elevation of the non-printed portions between the ink deposits increases as the distance between adjacent edges of the ink deposits decreases, and conversely, this elevation decreases as the distance between adjacent edges of the ink deposits increases. It can be thus seen that the elevation of the non-inked portions of the sheet occurring between the small, closely-spaced ink deposits may be controlled and retained at an elevation above other completely non-inked portions of the sheet. As shown in the above table, the depth of embossing (the difference between the thickness of the dot-printed portions of the sheet and the non-printed portions between the small ink deposits) is a function of the distance between the adjacent edges of the small ink deposits. For any printing condition, as the distance between the adjacent edges of the ink deposits increases, the embossing depth also increases to a maximum. Concurrently, other factors such as ink viscosity, ink penetration, ink deposition, and screen hole size can affect the elevation of the printed areas and thus the embossing depth. It is also clear that through the use of an appropriate number of openings and sizes in a single printing element, the desired shading of the design may, along with other factors, be utilized to produce an improved decorative embossed surface on the sheet. As previously stated, the decorative embossed surface of the surface covering of this invention may be, and normally would be, produced by using more than one rotary screen printer or its equivalent, which, of course, would add to the decorative appearance of the sheet as previously discussed herein.

Figure 6:
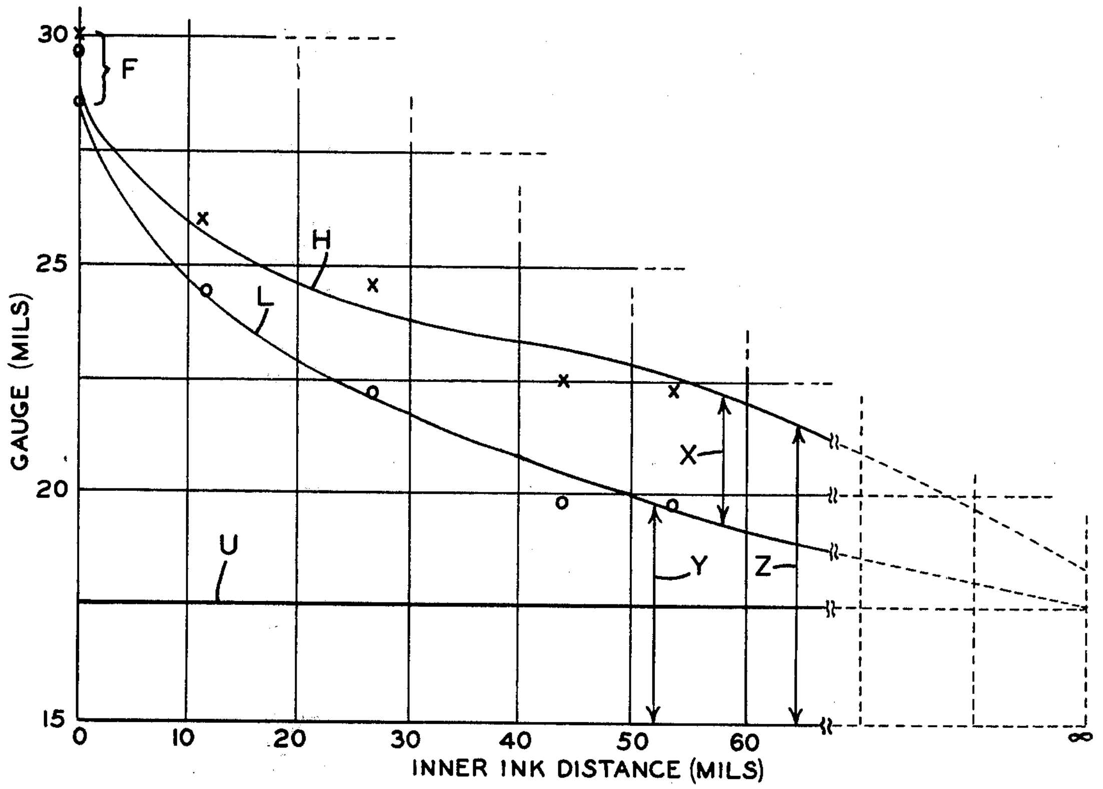
FIG. 6 is a graph showing the maximum height of the printed portions of the dot-printed areas of the sheet.

In the graph of FIG. 6 of the drawings which illustrates Example No. 2 in the above table, the upper curve line H shows the printed gauge Z of the sheet which occurs at the printed portions of the dot-printed areas thereof as the spacing between adjacent edges of the dots is varied. The lower curve line L shows the varying gauge Y of the sheet in the unprinted portions of the dot-printed areas of the sheet as the spacing between the adjacent edges of the dots is varied. The spacing between the line H and line L, indicated by the letter X, is the embossing depth of the sheet in the unprinted portions between the dots. Horizontal line U shows the melted-down gauge of large, completely unprinted areas of the sheet, and the range of the gauge of the sheet in the fully printed areas thereof is indicated at F. As clearly shown in FIG. 6, through the use of the present invention, four different levels of embossing may be achieved. The highest elevation would be the fully inked design areas, as indicated at F; next highest elevation would be at the tops of the dots in the dot-printed areas, as indicated by curve line H; next highest would be the uninked portions of the sheet between the dots, as indicated by curve line L; and finally, the lowest portion would be the larger completely uninked areas of the sheet, indicated by line U. The graph of FIG. 6 further makes it perfectly clear that, by this invention, a heretofore unobtainable control over the gauge of both printed and non-printed portions of the sheet may be achieved in a straightforward, simple, and effective manner whereby more decorative and desirable surface coverings may be produced.

What is claimed is:

1. A resinous surface covering having a decorative, multi-level wear surface comprising (a) a fused resinous base layer;

(b) a non-porous vinyl resin composition layer normally being of substantially constant thickness fused to and supported by said fused resinous base layer;

(c) design elements in said vinyl resin composition layer covering at least portions thereof in a pattern, said design elements including areas which are substantially completely filled with pigmented, fused resinous ink, areas having a plurality of minute closely spaced dots of fused, pigmented, resinous ink, the adjacent edge portions of at least a majority of said dots being variably separated from each other in distances varying from about 5 to 60 mils (0.13 to 1.52 mm) by non-ink-containing portions of said vinyl resin composition layer and, completely non-ink-containing areas, said areas containing the plurality of closely spaced dots having an overall elevation intermediate between that of the areas which are completely filled with the pigmented resinous ink and the completely non-ink-containing areas, said non-ink-containing portions of said vinyl resin composition layer between the dots of the dot-containing areas having elevations which decrease as the distance between the dots increases but, which, within the stated range of separating distance of the dots, are at elevations above those of the completely non-ink-containing areas.

2. The product according to claim 1 wherein the resinous base layer is fused to and supported by a backing.

3. The product according to claim 1 wherein the resinous base layer is pigmented and extends at least partially into the non-porous vinyl resin composition layer fused thereto.

4. The product according to claim 3 wherein said first and second ink-containing design elements have a color different from that of the fused resinous base layer.

5. The product according to claim 1 wherein the base layer is transparent and the backing has a colored upper surface.

6. The product according to claim 5 wherein said first and second ink-containing design elements have a color different from that of the backing.

7. The product according to claim 1 wherein the base layer is composed of vinyl resin.

8. The product according to claim 7 wherein the vinyl resin is poly(vinyl chloride).

9. The product according to claim 1 wherein the vinyl resin composition layer which is fused to the base coat is poly(vinyl chloride).

10. The product according to claim 1 wherein the vinyl resin composition layer which is fused to the base layer is translucent.

11. The product according to claim 1 wherein the second ink-containing design elements and said first non-ink-containing design portions have substantially the same elevation.

12. The product according to claim 1 wherein said first and second ink-containing design elements are similarly pigmented.

13. The product according to claim 1 wherein said first and second ink-containing design elements are differently pigmented.

14. The product according to claim 1 wherein the ink-containing design elements are opaque.

15. The product according to claim 1 wherein said first and second ink-containing design elements extend substantially completely through the thickness of the resinous sheet.

16. The product according to claim 1 wherein at least two of said second ink-containing design elements which are of different colors at least partially overlap.

* * * * *